United States Patent Office 3,810,978
Patented May 14, 1974

3,810,978
PROCESS FOR PRODUCING ANTILIPEMIC SUBSTANCE
Toshihiro Hamakawa, Motoyoshi Kajihara, Takashi Suzue, and Fumiaki Ogawa, Naruto, Japan, assignors to Taiho Pharmaceutical Company, Limited, Tokyo-to, Japan
No Drawing. Filed Dec. 6, 1971, Ser. No. 205,316
Int. Cl. A61k 17/00
U.S. Cl. 424—95          4 Claims

ABSTRACT OF THE DISCLOSURE

A process for producing an antilipemic substance comprises grinding an autolytic organ of a mammal in aqueous medium, autolyzing said organ in the aqueous medium to allow the autolyzed substance to be transferred into the aqueous medium, dialyzing the resulting liquid to remove low molecular weight substances dissolved in the aqueous medium, adding a deproteinizing agent to the nondialyzed portion for deproteinization, dialyzing the deproteinized liquid again to remove deproteinizing agent used, concentrating the resulting nondialyzed liquid, adding an organic solvent to the concentrated liquid to precipitate effective substance and recovering the precipitated effective substance.

The present invention relates to a process for producing an antilipemic substance from the organs of animals.

Various attempts have been made to extract from the organs of animals substances effective in the human body, including not only hormones and vitamins but also those effective against specific diseases. For instance, it has been proposed to prepare an epiphylactic substance from the marrow of animal (Japanese patent publication No. 21,794/1965) and to prepare from an organ a substance for controlling the function of the organ (Japanese patent publication No. 5,749/1957).

In conducting research on the utilization of the organs of animals, the present inventors have assumed that the organs of normal animals include a substance for controlling abnormal metabolism that causes hyperlipemia, and after various experiments we have found that a substance having high antilipemic activities can be extracted from the organs by a very advantageous industrial method.

Accordingly, a main object of this invention is to provide a substance having a high degree of antilipemic activity and to provide an industrially advantageous process for extracting an antilipemic substance from the organs of animals.

The process of the invention for producing an antilipemic substance comprises grinding an autolytic organ of mammal in aqueous medium, autolyzing the organ in the aqueous medium to allow the autolyzed substance to be transferred into the aqueous medium, dialyzing the resulting liquid to remove low molecular weight substances dissolved in the aqueous medium, adding a deproteinizing agent to the nondialyzed portion for deproteinization, dialyzing the deproteinized liquid again to remove the deproteinizing agent used, concentrating the resulting nondialyzed liquid, adding an organic solvent to the concentrated liquid to precipitate effective substance and recovering the precipitated effective substance by filtration.

The organs of mammal to be used as a material in accordance with this invention include all of the components of the living body having autolytic properties such as lung, liver, heart, kidney, pancreas, large intestine, small intestine, stomach, brain, muscle, blood, body fluid, etc., the most preferable being lung.

According to a preferred mode of this invention the organ is ground by a homogenizer or other suitable means with addition of distilled water. It is preferred to use the distilled water in an amount of 0.5 to 1 times the weight of the organ. The ground organ is then subjected to autolysis in the water. The autolysis can be conducted at room temperature or at a slightly higher temperature, generally at 20 to 40° C. The step of autolysis is very critical to this invention, and it is only through autolysis that a highly antilipemic substance can be obtained. In fact, it is impossible to produce such substance without carrying out autolysis. It is believed that an antilipemic substance is produced during autolysis. The effective substance produced by autolysis is transferred to the water. The transfer to water of the effective substance takes place at a pH range of 4 to 11 and is particularly promoted at a pH of 8 to 9.5. The pH of the autolyzed liquid varies with the kind of the starting organ but is usually slightly acidic, within the foregoing range, which permits the effective component to be transferred to water during the autolysis. To accelerate the transfer, the autolyzed liquid may be stirred, if desired. Before stirring it is preferable to add an alkali such as caustic soda, caustic potash, etc. to the liquid so as to adjust the pH range thereof in 8 to 9.5, whereby the transfer of the autolyzed substance is markedly accelerated.

Insolubles are removed from the autolyzed liquid and the resulting liquid is then subjected to dialysis to remove low molecular weight substances dissolved in liquid. Various dialyzing membranes known in the art may be used, but cellulose tube is preferable for the purpose. A deproteinizing agent is subsequently added to the nondialyzed portion obtained to remove the protein contained therein. The deproteinizing agent includes sodium chloride, ammonium sulfate, sodium sulfate, trichloroacetic acid, perchloric acid and the like. The amount of the deproteinizing agent to be used varies in accordance with the kinds thereof. When sodium chloride, ammonium sulfate or sodium sulfate is used, for instance, it is preferable to add such salt to the nondialyzed liquid so as to form a saturated solution of the salt added. When trichloroacetic acid is used, it is preferable to add such acid to the nondialyzed liquid so as to form a solution containing the acid in a concentration of 5 to 10 weight percent, and when perchloric acid is used it is preferably added to the liquid so as to form a solution containing the acid in a concentration of 10 to 20 weight percent.

After the deproteinization, dialysis is conducted again to remove the deproteinizing agent from the resulting liquid. For this purpose, a dialyzing membrane of the same material as used in the previous step is used, preferably cellulose tube. The nondialyzed liquid thus obtained is then concentrated under a reduced pressure. An organic solvent such as methanol, ethanol and the like lower alcohol, acetone, benzene, ethyl ether, etc. is added to the concentrated liquid to precipitate the effective substance. The desired product will then be recovered by filtration in the form of a white or light yellow powder.

The substance obtained by this invention has the following properties. It is a white or light yellow powder and is readily soluble in water but insoluble in methanol, ethanol, acetone, benzene and ethylether. As to its chemical properties, the substance proves to be positive when tested by ninhydrin method, Folin-Lowry's method, Elson-Morgan's method and M. Dubois' phenol-sulfuric acid method, and negative by Fiske-Subbarow's method, diphenylamine method and orcinol methods. The intensity of color of the substance produced by ninhydrin reaction lowers when it is subjected to acid hydrolysis and alkali hydrolysis, while the color is intensified when it is subjected to hydrolysis with protease. The present substance is resistant to heat and even when a 10 weight percent aqueous solution thereof is heated at 100° C. for 30 minutes, its pharmacological activities to be described below will not be impaired at all. However, hydrolysis with acid, alkali and protease deprives the substance of all the pharmacological activities. Further use of a deproteinizing agent such as sodium chloride, ammonium sulfate, trichloroacetic acid, perchloric acid or the like does not cause the present substance to precipitate.

The substance of this invention has the following pharmacological activities. It reduces the content of lipid (total lipid, total cholesterol and free aliphatic acid) in the blood and releases lipoprotein lipase activities in the blood, thus producing outstanding antilipemic activities.

Examples of this invention will be given below, but the invention is not limited thereto.

EXAMPLE 1

70 g. of lung of a rabbit was ground by a homogenizer with addition of 35 ml. of distilled water, and the mixture was left to stand in a thermostat at 25° C. for 24 hours to effect autolysis. The autolyzed mixture was then adjusted to a pH of 9.0 by the addition of a solution of caustic soda and left for standing for 1 hour. The liquid was then centrifuged at 5,000 r.p.m. for separation to obtain 45 ml of a supernatant liquid. The supernatant liquid was subjected to dialysis for 15 hours by using a cellulose tube ("Cellulose Tube 36/32" trade name, product of Wako Junyaku Kabushiki Kaisha, Japan), with distilled water flowing outside the tube, whereby 46 ml. of a nondialyzed liquid was obtained. To the liquid was added 35 g. of ammonium sulfate and the resulting mixture was stirred for about 4 hours. This was followed by centrifuging at 3,000 r.p.m. to give 37 ml. of a supernatant liquid. The supernatant liquid thus prepared was again subjected to dialysis for 15 hours by using the same cellulose tube as before, with distilled water flowing outside the tube. The resulting nondialyzed liquid was thereafter concentrated to 1 ml. of 40° C. under a reduced pressure. 20 ml. of acetone was added to the concentrated liquid, and the precipitate thereby produced was filtered off to obtain 42 mg. of crystals.

The product thus obtained had an intrinsic viscosity $[\eta]$ of 0.1213, which was measured at 25° C. using water as a solvent.

Infrared spectroscopic analysis of the product gave the following absorption:
3300 cm.$^{-1}$, 2950 cm.$^{-1}$, 1715 cm.$^{-1}$, 1650 cm.$^{-1}$, 1215 cm.$^{-1}$ and 1025 cm.$^{-1}$.

The following tests were conducted by using the substance obtained in Example 1. In these tests, quantitative determination of the lipid in the blood and that of the lipoprotein lipase in the blood were conducted in accordance with the method described in J. Lipid Res. 6, 16 (1965) and "The Method of Experiments on Lipids" described in "Proteins, Nucleic Acids and Enzymes," p. 213, Kyoritsushuppan Kabushiki Kaisha, Japan, 1968, respectively. Male rats of 9 weeks, weighing about 200 grams were used for the tests, 10 rats in each group. The results are given in Table 1 wherein it is shown that with respect to hyperlipemia-affected rates obtained by intravenously administering 20 mg./100 g. of "Triton WR 1339" (trademark, product of Rohm and Hass Co., U.S.A., which is a surfactant employed for preparing hyperlipemia-affected animals for experiment), those intraperitoneally administered with 0.6 mg./100 g. of the present substance exhibited an outstanding anilipemic effect and lipoprotein lipase activity in contrast with those of control administered with a physiological salt solution.

Table 1 shows the lipid content in the blood and lipoprotein lipase activity in the blood.

TABLE 1

| | Lipid in blood | | | |
|---|---|---|---|---|
| | Total lipid, mg./dl. | Total cholesterol, mg./dl. | Free aliphatic acid μmol/ml. | Lipoprotein lipase activity* |
| Normal rats | 37 | 5 | 0.090 | 0.82 |
| Hyperlipemia-affected rats (control) | 186 | 51 | 0.120 | 0.10 |
| Hyperlipemia-affected rats as above administered with the present substance | 50 | 10 | 0.095 | 0.77 |

*Given in C.A. (clearing factor activity) unit.

EXAMPLE 2

In order to show the need for autolysis in the process of this invention, an autolyzed lung and a nonautolyzed lung were subjected to dialysis after extracting at a pH of 9.0 in accordance with Example 1, this being followed by subsequent procedures as in Example 1. The product obtained from the autolyzed lung had an intrinsic viscosity of 0.1213 (in water at 25° C.) and showed the same absorption in infrared spectroscopic analysis as that of the product of Example 1.

The resulting substances were given to animals to determine the lipid content in the blood and lipoprotein lipase activity in the blood. The tests were performed in the same manner as in Example 1. The results are given in Table 2.

TABLE 2

| | Lipid in blood | | | |
|---|---|---|---|---|
| Animals | Total lipid, mg./dl. | Total cholesterol, mg./dl. | Free aliphatic acid μmol/ml. | Lipoprotein lipase activity* |
| Normal animals | 32 | 4 | 0.084 | 0.66 |
| Hyperlipemia-affected animals (control) | 151 | 26 | 0.115 | 0.04 |
| Hyperlipemia-affected animals administered with substance obtained from autolyzed organ | 35 | 7 | 0.086 | 0.38 |
| Hyperlipemia-affected animals administered with substance obtained without autolysis | 146 | 24 | 0.110 | 0.06 |

*Given in C.A. (clearing factor activity) unit.

The substance prepared from an autolyzed organ exhibited much higher antilipemic activity than the substance obtained without autolysis. Moreover, as apparent from a comparison with the control, the latter did not show such activity at all.

EXAMPLE 3

Lung of a rabbit was ground and autolized in the same manner as in Example 1. To the autolyzed liquid of pH 6.6 to 6.8 was added hydrochloric acid or caustic soda to adjust the pH to the values shown in Table 3 below. Then the subsequent procedures were conducted in the same manner as in Example 1.

The lipid content in the blood and lipoprotein lipase activity in the blood were determined in the same manner as in Example 1, using the substances thus obtained. The results are given in Table 3.

TABLE 3

| | Lipid in blood | | | |
|---|---|---|---|---|
| | Total lipid, mg./dl. | Total cholesterol, mg./dl. | Free aliphatic acid μmol/ml. | Lipoprotein lipase activity |
| Normal rats | 32 | 4 | 0.080 | 0.66 |
| Hyperlipemia-affected rats (control) | 151 | 26 | 0.115 | 0.04 |
| Hyperlipemia-affected rats administered with with the substance extracted at— | | | | |
| pH 4.0 | 91 | 13 | 0.096 | 0.20 |
| pH 5.0 | 80 | 10 | 0.094 | 0.24 |
| pH 6.0 | 76 | 9 | 0.094 | 0.28 |
| pH 7.0 | 62 | 7 | 0.090 | 0.32 |
| pH 8.0 | 38 | 5 | 0.088 | 0.32 |
| pH 9.0 | 35 | 7 | 0.086 | 0.38 |
| pH 10.0 | 36 | 6 | 0.084 | 0.30 |
| pH 11.0 | 59 | 14 | 0.091 | 0.23 |

As will be apparent from Table 3, when the pH of the liquid prepared from autolysis of the organ is in the range of 4.0 to 11.0, the effective component satisfactorily transfers into the liquid. When subjected to dialysis, a liquid of pH in this range can give a highly antilipemic substance. It is seen that the pH ranging from 8 to 9.5 will promote the foregoing transfer.

EXAMPLE 4

70 g. of liver of a cow was ground by a homogenizer with addition of 70 ml. of distilled water, and the mixture was left to stand at 30° C. for 20 hours to effect autolysis. The autolyzed mixture was then adjusted to a pH of 9.5 with a solution of caustic soda and left for standing for 1 hour. The mixture was centrifuged at 5,000 r.p.m. for separation to obtain 80 ml. of a supernatant liquid. The supernatant liquid was subjected to dialysis for 18 hours by using the same cellulose tube as in Example 1, with distilled water flowing outside the tube, whereby 81 ml. of a nondialyzed liquid was obtained. To the liquid was added 10 ml. of 20% trichloroacetic acid and the resulting mixture was stirred for about 4 hours. This was followed by centrifuging at 3,000 r.p.m. to give 67 ml. of a supernatant liquid. The supernatant liquid thus prepared was again subjected to dialysis for 24 hours by using the same cellulose tube as in Example 1, with distilled water flowing outside the tube. The resulting nondialyzed liquid was thereafter concentrated to 2.0 ml. at 60° C. under a reduced pressure. 45 ml. of 99 wt. percent ethanol was added to the concentrated liquid, and the precipitate thereby produced was filtered off to obtain 48 mg. of crystals. The product thus obtained had an intrinsic viscosity of 0.1213 (in water at 25° C.) and showed the same absorption in infrared spectroscopic analysis as that of the product of Example 1.

The lipoprotein lipase activity of the product thus obtained was determined in the same manner as in Example 1 with the results shown in appended Table 4.

EXAMPLE 5

100 g. of heart of a cow was ground by a homogenizer with addition of 140 ml. of distilled water, and the mixture was left to stand at 20° C. for 24 hours to effect autolysis. The autolyzed mixture was then adjusted to a pH of 7.0 with a solution of caustic soda and left standing for 1 hour. The mixture was centrifuged at 6,000 r.p.m. for separation to obtain 160 ml. of a supernatant liquid. The supernatant liquid was subjected to dialysis for 24 hours by using the same cellulose tube as in Example 1, with distilled water flowing outside the tube, whereby 170 ml. of a nondialyzed liquid was obtained. To the liquid was added 70 g. of sodium sulfate and the resulting mixture was stirred for about 4 hours. This was followed by centrifuging at 3,000 r.p.m. to give 120 ml. of a supernatant liquid. The supernatant liquid thus prepared was again subjected to dialysis for 48 hours by using the same cellulose tube as in Example 1, with distilled water flowing outside the tube. The resulting non-dialyzed liquid was thereafter concentrated to 4.0 ml. at 80° C. under a reduced pressure. 100 ml. of 99 wt. percent ethanol was added to the concentrated liquid, and the precipitate thereby produced was filtered off to obtain 61 mg. of crystals. The product thus obtained had an intrinsic viscosity of 0.1213 (in water at 25° C.) and showed the same absorption in infrared spectroscopic analysis as that of the product of Example 1.

The lipoprotein lipase activity of the product determined by the same experiment as in Example 1 is shown in appended Table 4.

EXAMPLE 6

600 g. of lung of a pig was ground by a homogenizer with addition of 600 ml. of distilled water, and the mixture was left to stand at 37° C. for 20 hours to effect autolysis. The autolyzed mixture was then adjusted to a pH of 4.0 with a solution of hydrochloric acid and left for standing for 1 hour. The mixture was centrifuged at 5,000 r.p.m. for separation to obtain 700 ml. of a supernatant liquid. The supernatant liquid was subjected to dialysis for 30 hours by using the same cellulose tube as in Example 1, with distilled water flowing outside the tube, whereby 850 ml. of a nondialyzed liquid was obtained. To the liquid was added 35 ml. of 60% perchloric acid and the resulting mixture was stirred for about 6 hours. This was followed by centrifuging at 3,000 r.p.m. to give 570 ml. of a supernatant liquid. The supernatant liquid thus prepared was again subjected to dialysis for 48 hours by using the same cellulose tube as in Example 1, with distilled water flowing outside the tube. The resulting non-dialyzed liquid was thereafter concentrated to 10 ml. at 50° C. under a reduced pressure. 300 ml. of 99% ethanol was added to the concentrated liquid, and the precipitate thereby produced was filtered off to obtain 350 mg. of crystals. The product thus obtained had an intrinsic viscosity of 0.1213 (in water at 25° C.) and showed the same absorption in infrared spectroscopic analysis as that of the product of Example 1.

The lipoprotein lipase activity of the product determined in the same manner as in Example 1 is shown in appended Table 4.

EXAMPLE 7

70 g. of lung of a rabbit was ground by a homogenizer with addition of 70 ml. of distilled water, and the mixture was left to stand in a thermostat at 40° C. for 20 hours to effect autolysis. The autolyzed mixture was then adjusted to a pH of 11 with a solution of caustic soda and left for standing for 1 hour. The mixture was centrifuged at 5,000 r.p.m. for separation to obtain 80 ml. of a supernatant liquid. The supernatant liquid was subjected to dialysis for 24 hours by using the same cellulose tube as in Example 1, with distilled water flowing outside the tube, whereby 81 ml. of a nondialyzed liquid was obtained. To the liquid was added 50 ml. of 60% perchloric acid and the resulting mixture was stirred for about 10 hours. This was followed by centrifuging at 3,500 r.p.m. to give 71 ml. of a supernatant liquid. The supernatant liquid thus prepared was again subjected to dialysis for 24 hours by using the same cellulose tube as in Example 1, with distilled water flowing outside the tube. The resulting nondialyzed liquid was thereafter concentrated to 2.0 ml. at 70° C. under a reduced pressure. 25 ml. of acetone was added to the concentrated liquid, and the precipitate thereby produced was filtered off to obtain 45 mg. of crystals. The product thus obtained had an intrinsic viscosity of 0.1213 (in water at 25° C.) and showed the same absorption in infrared spectroscopic analysis as that of the product of Example 1.

The lipoprotein lipase activity of the product was determined in the same manner as in Example 1 is shown in appended Table 4.

EXAMPLE 8

100 g. of brain of a pig was ground by a homogenizer with addition of 100 ml. of distilled water, and the mixture was left to stand at 20° C. for 20 hours to effect autolysis. The autolyzed mixture was then adjusted to a pH of 9 with a solution of caustic soda and left for standing for 1 hour. The mixture was centrifuged at 5,000 r.p.m for separation to obtain 120 ml. of a supernatant liquid. The supernatant liquid was subjected to dialysis for 24 hours by using the same cellulose tube as in Example 1, with distilled water flowing outside the tube, whereby 150 ml. of a nondialyzed liquid was obtained. To the liquid was added 114 g. of ammonium sulfate and the resulting mixture is stirred for about 4 hours. This was followed by centrifuging at 3,000 r.p.m. to give 140 ml. of a supernatant liquid. The supernatant liquid thus prepared was again subjected to dialysis for 48 hours by using the same cellulose tube as in Example 1, with distilled water flowing outside the tube. The resulting nondialyzed liquid was thereafter concentrated to 10 ml. at 50° C. under a reduced pressure. 300 ml. of 99 wt. percent ethanol was added to the concentrated liquid, and the precipitate thereby produced was filtered off to obtain 55 mg. of crystals. The product thus obtained had an intrinsic viscosity of 0.1213 (in water at 25° C.) and showed the same absorption in infrared spectroscopic analysis as that of the product of Example 1.

The liproprotein lipase activity of the product determined in the same manner as in Example 1.

EXAMPLE 9

200 g. of liver of a rabbit was ground by a homogenizer with addition of 200 ml. of distilled water, and the mixture was left to stand at 25° C. for 18 hours to effect autolysis. The autolyzed mixture was then adjusted to a pH of 8 with a solution of caustic soda and left standing for 1 hour. The mixture was centrifuged at 5,000 r.p.m. for separation to obtain 250 ml. of a supernatant liquid. The supernatant liquid was subjected to dialysis for 24 hours by using the same cellulose tube as in Example 1, with distilled water flowing outside the tube, whereby 300 ml. of a nondialyzed liquid was obtained. To the liquid was added 100 ml. of 20 wt. percent trichloroacetic acid and the resulting mixture was stirred for about 4 hours. This was followed by centrifuging at 3,000 r.p.m. to give 380 ml. of a supernatant liquid. The supernatant liquid thus prepared was again subjected to dialysis for 72 hours by using the same cellulose tube as in Example 1, with distilled water flowing outside the tube. The resulting nondialyzed liquid was thereafter concentrated to 10 ml. at 50° C. under a reduced pressure. 300 ml. of 99 wt. percent ethanol was added to the concentrated liquid, and the precipitate thereby produced was filtered off to obtain 120 mg. of crystals. The product thus obtained had an intrinsic viscosity of 0.1213 (in water at 25° C.) and showed the same absorption in infrared spectroscopic analysis as that of the product of Example 1.

The lipoprotein lipase activity of the product determined in the same experiment as in Example 1 is shown in appended Table 4.

EXAMPLE 10

To 1 liter of blood of a cow was added 1 liter of distilled water to cause hemolysis, and the mixture was left to stand in a thermostat at 37° C. for 18 hours to effect autolysis. The autolyzed mixture was then centrifuged at 5,000 r.p.m. for separation to obtain 2 liters of a supernatant liquid. The supernatant liquid was then treated in the same manner as in Example 8, whereby 13 mg. of crystals were obtained. The product thus obtained had an intrinsic viscosity of 0.1213 (in water at 25° C.) and showed the same absorption in infrared spectroscopic analysis as that of the product of Example 1.

The liproprotein lipase activity of the product determined in the same manner as in Example 1 is shown in appended Table 4.

EXAMPLE 11

1 kg. of small intestine of a cow thoroughly washed with water was ground by a homogenizer with addition of 1 liter of distilled water, and the mixture was left to stand in a thermostat at 30° C. for 20 hours to effect autolysis. The autolyzed mixture was then centrifuged at 5,000 r.p.m. for separation to obtain 1,200 ml. of a supernatant liquid. The supernatant liquid was then treated in the same manner as in Example 8, whereby 220 mg. of crystals were obtained. The product thus obtained had an intrinsic viscosity of 0.1213 (in water at 25° C.) and showed the same absorption in infrared spectroscopic analysis as that of the product of Example 1.

The lipoprotein lipase activity of the product determined in the same manner as in Example 1 is shown in Table 4.

TABLE 4

| | Lipoprotein lipase activity |
|---|---|
| Normal rats | 0.71 |
| Hyperlipemia-affected rats (control) | 0.05 |
| Hyperlipermia-affected rats administered with the product of: | |
| Example 4 | 0.60 |
| Example 5 | 0.64 |
| Example 6 | 0.40 |
| Example 7 | 0.50 |
| Example 8 | 0.62 |
| Example 9 | 0.42 |
| Example 10 | 0.42 |
| Example 11 | 0.52 |

What we claim is:

1. A process for producing an antilipemic substance comprising grinding an autolytic organ selected from the group consisting of lung, liver, heart, kidney, pancreas, large intestine, small intestine, stomach, brain, muscle and blood of mammal in aqueous medium, autolyzing at 20° C.–40° C. said organ in the aqueous medium to allow the autolyzed substance to be transferred into the aqueous medium, dialyzing the resulting liquid to remove low molecular weight substances dissolved in the aqueous medium, adding a deproteinizing agent selected from the group consisting of sodium chloride, ammonium sulfate, sodium sulfate, trichloroacetic acid and perchloric acid to the nondialyzed portion for deproteinization, dialyzing the deproteinized liquid again to remove deproteinizing agent used, concentrating the resulting nondialyzed liquid under reduced pressure, adding an organic solvent selected from the group consisting of lower alkyl alcohols and acetone to the concentrated liquid to precipitate the effective substance and recovering the precipitated effective substance.

2. The process according to claim 1, in which said organ of mammal is lung.

3. The process according to claim 1, in which said autolyzed substance is transferred into the aqueous medium at a pH of 8 to 9.5.

4. An antilipemic substance prepared by the method claimed in claim 1.

References Cited

UNITED STATES PATENTS

| | | | |
|---|---|---|---|
| 3,034,963 | 5/1962 | Wachtel | 424—95 |
| 3,467,749 | 9/1969 | Cevallos | 424—106 |

SAM ROSEN, Primary Examiner

U.S. Cl. X.R.

424—101, 103, 104, 106, 110